Nov. 3, 1953

W. J. SOCKELL 2,657,959

JOURNAL BOX LUBRICATOR

Filed March 26, 1952

INVENTOR
William J. Sockell
BY John H. Randolph
ATTORNEY

Nov. 3, 1953 W. J. SOCKELL 2,657,959
JOURNAL BOX LUBRICATOR
Filed March 26, 1952 2 Sheets-Sheet 2
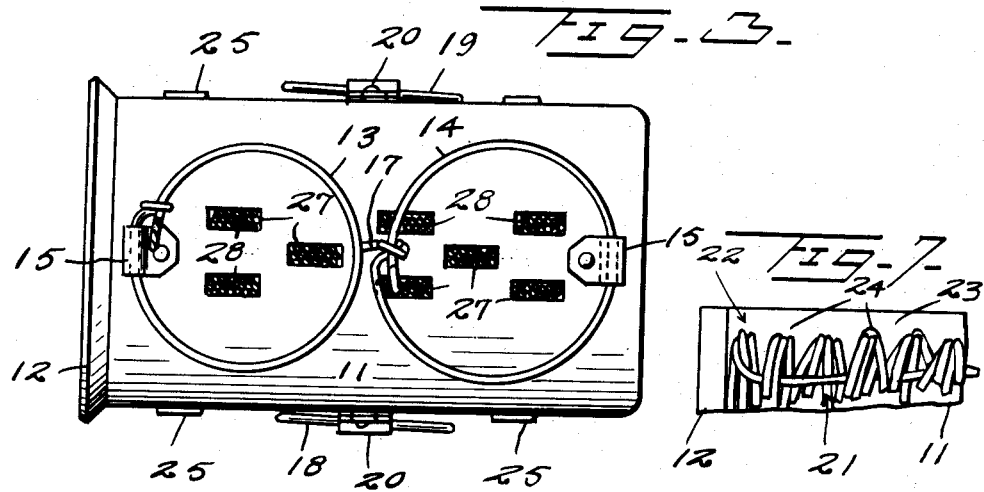
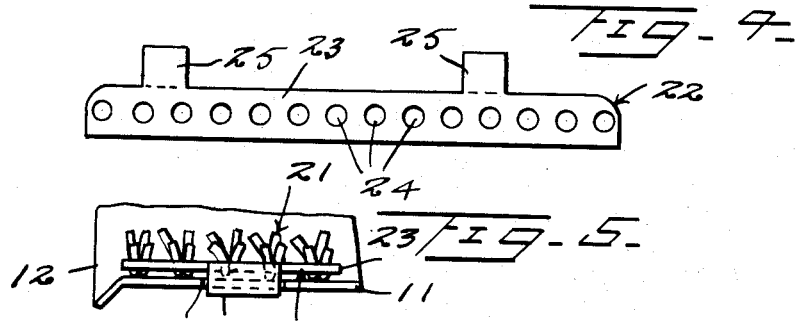
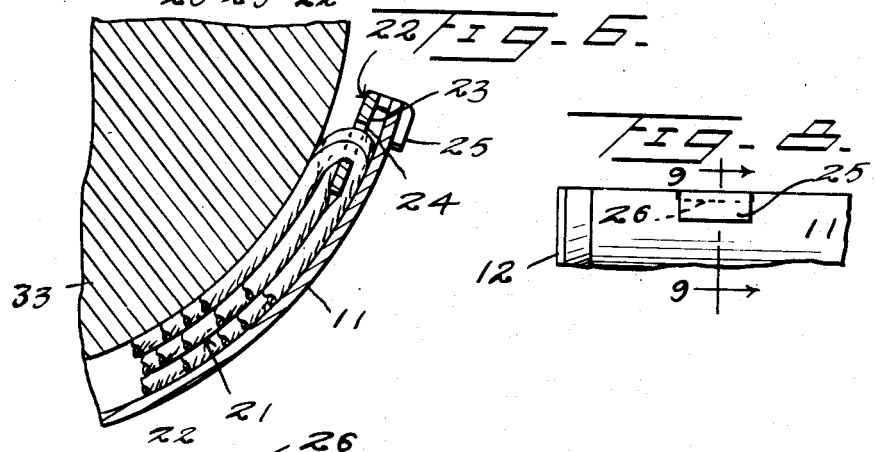
INVENTOR
William J. Sockell
BY John N. Randolph
ATTORNEY Patented Nov. 3, 1953

2,657,959

UNITED STATES PATENT OFFICE 2,657,959

JOURNAL BOX LUBRICATOR

William J. Sockell, Raleigh, N. C.

Application March 26, 1952, Serial No. 278,696

6 Claims. (Cl. 308—88)

1

This invention relates to a novel lubricating device for journal boxes of railway rolling stock and has for its primary object to provide an applicating device by means of which the lubricant is effectively supplied to a wheel shaft or axle end located in a journal box to maintain the shaft or axle end which engages the journal box bearing properly lubricated at all times.

More particularly, it is an object of the present invention to provide a device especially adapted for use with conventional journal boxes to replace the waste commonly employed in journal boxes for conveying the lubricant from the bottom of the journal box to the axle or shaft end and which will be effective in eliminating hotboxes caused by the use of such waste.

Another primary object of the invention is to provide a lubricating device which may be readily applied to a journal box and positioned in engagement with the shaft or axle end located therein without removing the journal box from said end and without requiring any modification in the journal box.

A further object of the invention is to provide a lubricating device including a unique pad for engaging the shaft or axle end and which is spring held in engagement therewith and maintained against movement within the journal box around the axle end.

A further object of the invention is to provide a novel combination of lubricating pad and pad support which is so constructed that the pad may be readily replaced.

Various other objects and advantages of the invention will hereinafter become more fully apparent from the following description of the drawings, illustrating a presently preferred embodiment thereof, and wherein:

Figure 3 is a bottom plan view of the lubricator with the side spring support shown in a folded position;

Figure 4 is a plan view of one element of the lubricator;

Figure 5 is a fragmentary top plan view of a portion of the lubricator;

Figure 6 is an enlarged fragmentary cross sectional view of a portion of the lubricator including a portion of the shaft or axle;

2

Figures 1, 2:
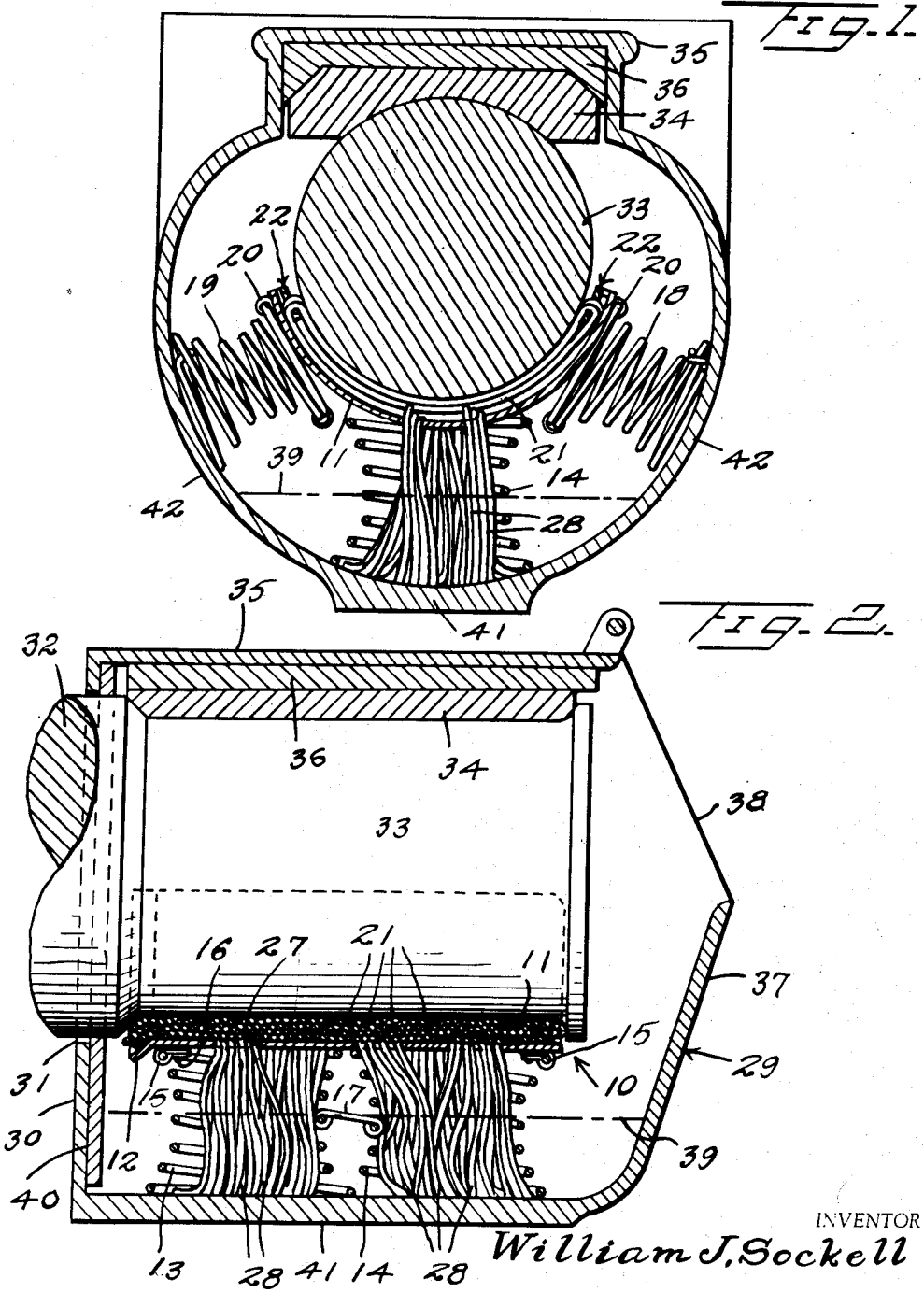
Figure 1 is a cross sectional view of a conventional journal box showing the lubricator in cross section in an applied position therein.
Figure 2 is a longitudinal sectional view partly in side elevation taken substantially centrally through the journal box and showing the lubricator in longitudinal section.

Figure 7 is a fragmentary side elevational view looking toward a portion of the inner side of the lubricator;

Figure 8 is a fragmentary side elevational view looking toward the outer opposite side of a portion of the lubricator, and Figure 9 is a sectional view taken substantially along a plane as indicated by the line 9—9 of Figure 8.

Referring more specifically to the drawings, the lubricator or lubricant applicator, designated generally 10 and comprising the invention includes a pad holder or follower 11 of arcuate cross section, preferably constituting somewhat less than half a circle. The holder or follower 11 is substantially rigid and is preferably formed of a sheet material and has an outwardly flared end 12 which projects from its under or outer convex side. A pair of expansion coiled springs 13 and 14 are connected to the outer convex side of the holder 11 intermediate of its side edges and one adjacent each end thereof. The springs 13 and 14 are each connected to the holder 11 by a strap loop 15 which is preferably formed of metal and which is looped around a portion of an end convolution of the spring 13 or 14 and secured at its ends by a fastening 16 to the holder 11. The two strap loops 15 are disposed one adjacent each end of the holder 11 and intermediate of its side edges. Other portions of the end convolutions of the springs 13 and 14 which engage the straps 15 bear against the convex side of the holder 11 and are retained in engagement therewith by means of a link 17. The link 17, as seen in Figure 2, is secured at its ends to an intermediate convolution of each spring 13 and 14 to retain the springs in substantially parallel relationship to one another. The springs 13 and 14 constitute the bottom supporting springs of the lubricator 10.

Said lubricator is also provided with a pair of side springs 18 and 19, each of which likewise constitutes an expansion coiled spring and which springs function to maintain the holder or follower 11 in a properly centered position, as will hereinafter become apparent. The springs 18 and 19 are each swingably connected to the holder 11 intermediate of its ends and one adjacent each side edge thereof. The holder 11 is provided with a pair of strap members 20, corresponding to the strap members 15, one of which is mounted adjacent each side edge and on the convex side of the holder 11. Loop portions of the strap members 20 each engages a portion of an end convolution of one of the springs 18 and 19 which portions turnably engage therein so that the springs 18 and 19 are capable of swinging upwardly and inwardly from their positions of Figure 1 to overlapping folded positions within the concave inner side of the holder 11, as illustrated in Figure 3, wherein only the outer convolution of each of the side springs is visible.

A lubricating pad 21 is suspended on the inner side of the holder or follower 11 by a pair of corresponding hangers 22 which detachably mount the pad 21. Each hanger 22 includes an elongated bar 23 having a series of longitudinally spaced openings 24. Two or more extensions project laterally from one longitudinal edge of each bar 23 and are bent to extend transversely to the plane of the bar and are then turned back to form hooks 25 which are adapted to engage around portions of the side edges of the holder 11, preferably in notches 26 formed in said side edges to accommodate the hooks 25. One of the hangers 22 is thus suspended from each side edge of the holder 11 and on the inner or concave side of the holder. The pad 21 preferably comprises a single strand of yarn of a suitable material such as wool which is lapped back and forth through the openings 24 of the two hangers 22 to form a mass of yarn laps which extend substantially from end-to-end of the holder 11, as illustrated in Figure 2.

The bottom or intermediate portion of the holder 11 is provided with a plurality of openings 27, each of which is preferably elongated longitudinally of the holder. A plurality of yarn strands 28 have intermediate portions looped around the laps of the yarn forming the pad 21 and end portions extending downwardly therefrom through the openings 27 and thence downwardly through one of the coiled springs 13 or 14.

A conventional journal box 29 of the type used for railway cars and other rolling stock is illustrated in Figures 1 and 2. The journal box 29 has an inner wall 30 provided with an opening 31 through which a portion of a wheel shaft or axle 32 extends and in which it is turnably disposed. The shaft or axle 32 is provided with a restricted portion 33 disposed within the journal box 29 on which a bearing 34 engages. The bearing 34 is disposed in the upper part of the journal box between its top wall 35 and the axle portion 33. A wedge 36 is interposed between the bearing 34 and wall 35 and functions in a conventional manner to retain the bearing properly positioned. The top wall 35 constitutes the load supporting portion of the journal box 29. The outer wall 37 of the journal box 29 is provided with a relatively large opening 38 in the upper part thereof, normally closed by a hinged closure, not shown. The bottom portion of the journal box 29 contains a lubricant such as oil normally up to the level approximately as indicated by the broken line 39 in Figures 1 and 2. An oil seal 40 is normally disposed against the inner side of the wall 30 and around the axle or shaft 32. The parts 29 to 40 are all of conventional construction and have been illustrated merely for the purpose of illustrating the application and use of the lubricator 10 with a conventional journal box.

The lubricator 10 can be applied to the journal box 29 without removing it from the shaft or axle 32 by simply lifting or jacking up the journal box so that the wedge 36 and bearing 34 can be removed through the opening 38. The journal box 29 is then slid to the right as seen in Figure 2 to displace the axle 32 away from the opening 38. With the springs 13, 14, 18 and 19 pressed tight against the pad holder 11, the lubricator 10 is inserted into the journal box through its opening 38 and under the axle 32. The pivotal mounting of the springs 18 and 19 enable these springs to be rocked relatively to the holder 11 to facilitate the application of the lubricator 10 to the journal box 29 without removing the journal box from the axle 32, and the springs 18 and 19 are then swung downwardly so that their inner convolutions abut against the outer side of the holder 11. The journal box 29 is then displaced from right to left of Figure 2 so that the axle portion 32 will resume its position as seen in Figure 2 and with the lubricator 10 disposed in engagement with the axle portion 33, as illustrated in Figures 1 and 2. With the lubricator 10 thus disposed, the bottom springs 13 and 14 are disposed directly beneath the axle portion 33 in the center of the holder 11 and with their bottom convolutions resting upon the bottom portion 41 of the journal box 29. The springs 18 and 19 extend outwardly and downwardly from the side portions of the holder 11 and are disposed with their outer convolutions abutting against the side walls 42 of the journal box, as seen in Figure 1. The four coiled springs when thus disposed will effectively urge the holder 11 toward the axle portion 33 to maintain the pad 21 in contact therewith and engaging thereagainst with a proper pressure. The springs 18 and 19 will effectively resist any tendency of the holder 11 to turn in either direction within the journal box 29 and relatively to the axle 32. The ends of the strands 28 function as wicks for conveying the lubricant from the bottom of the journal box upwardly to the pad 21 to maintain said pad properly saturated with the lubricant to insure a proper lubrication of the axle portion 33 and bearing 34. As illustrated in Figures 1 and 2, the strand ends 28 are of sufficient length to extend to and engage against the bottom 41.

It will be readily apparent that the lubricator 10 may be readily removed and replaced in the manner heretofore described and that the pad 21 is replaceably supported in the holder 11 by the hangers 22 so that said pad may be readily replaced if necessary.

Various modifications and changes are contemplated and may obviously be resorted to, without departing from the spirit or scope of the invention as hereinafter defined by the appended claims.

I claim as my invention:

1. A journal box lubricator comprising an elongated pad holder of arcuate cross section adapted to be disposed in a journal box around the underside of a wheel axle, a pad detachably mounted in the pad holder and adapted to be supported thereby in engagement with the axle, a plurality of wick elements connected to the pad and extending downwardly therefrom and from the holder and adapted to be submerged in a lubricant contained in the bottom portion of the journal box, a pair of bottom expansion coiled springs having upper convolutions secured to the under convex side of the holder intermediate of its side edges and one adjacent each end, said bottom springs extending downwardly from the holder and having bottom convolutions adapted to rest on a bottom portion of the journal box for yieldably supporting the holder with the pad in engagement with the axle, and a pair of coiled expansion springs forming side springs, said side springs each having an inner end convolution having a portion swingably connected to the outer side of the holder adjacent the side edge thereof, said side springs normally extending outwardly and downwardly from the sides of the holder and having outer convolutions adapted to bear against side walls of the journal box, the inner convolutions of said side springs being maintained by the compression thereof in engagement with the side portions of the outer side of the holder, and said side springs and bottom springs being adapted to cooperate with one another and with the journal box in maintaining the holder in a centered position in the journal box and beneath a portion of the wheel axle.

2. A journal box lubricator as in claim 1, a pair of strap members secured to the outer side of the holder one adjacent each side edge thereof, said strap members each providing a loop in which a portion of the inner end convolution of one of the side springs turnably engages for swingably connecting the side springs to the holder adjacent its side edges.

3. A journal box lubricator as in claim 1, each of said bottom and said springs having enlarged end convolutions one of which is adapted to engage a wall portion of the journal box and the other of which engages a portion of the convex side of the holder.

4. A journal box lubricator as in claim 1, said pad including a pair of hanger members, each hanger member comprising an elongated bar having a plurality of longitudinally spaced openings, a plurality of hooks projecting from one longitudinal edge of the bar and detachably engaging over a longitudinal edge of the holder for mounting the bar on the inner side of the holder and adjacent said edge, and said pad comprising yarn extending back and forth through the openings of the two hangers and comprising a mass of transverse yarn laps extending substantially from end-to-end of the holder.

5. A journal box lubricator as in claim 4, said holder having a plurality of openings at the bottom thereof, said wick elements comprising strands of yarn having intermediate portions engaging around certain of the laps of the pad mass and having end portions extending downwardly through the holder openings.

6. The combination with a wheel axle and a journal box in which a portion of the wheel axle is journalled and which journal box is provided with a round bottom and sides disposed substantially concentrically around said wheel axle portion, of an elongated pad holder of arcuate cross section disposed in the journal box around the underside of said wheel axle portion, a pad detachably mounted in the pad holder and supported thereby in engagement with said wheel axle portion, at least one wick element connected to the pad and extending downwardly therefrom and from the holder and adapted to be submerged in a lubricant contained in the bottom portion of the journal box, bottom expansion coiled springs having upper convolutions secured to the under convex side of the holder intermediate of its side edges and having bottom convolutions resting on the bottom portion of the journal box for yieldably supporting the holder with the pad in engagement with said wheel axle portion, and coiled expansion springs forming side springs each having an inner convolution swingably connected to the outer side of the holder adjacent a side edge thereof, said side springs extending outwardly and downwardly from the sides of the holder and having outer convolutions bearing against the side walls of the journal box, said side springs and bottom springs cooperating with one another and with the journal box to maintain the holder in a centered position in the journal box and beneath said wheel axle portion and substantially concentric thereto.

WILLIAM J. SOCKELL.

References Cited in the file of this patent

UNITED STATES PATENTS

| Number | Name | Date |
|---|---|---|
| 111,286 | Wendell | Jan. 24, 1871 |
| 145,226 | Moulton | Dec. 2, 1873 |

FOREIGN PATENTS

| Number | Country | Date |
|---|---|---|
| 652,972 | France | Mar. 15, 1929 |